H. C. HODGES.
CAR TRUCK.
APPLICATION FILED DEC. 27, 1909.
1,006,943.
Patented Oct. 24, 1911.
3 SHEETS—SHEET 3.
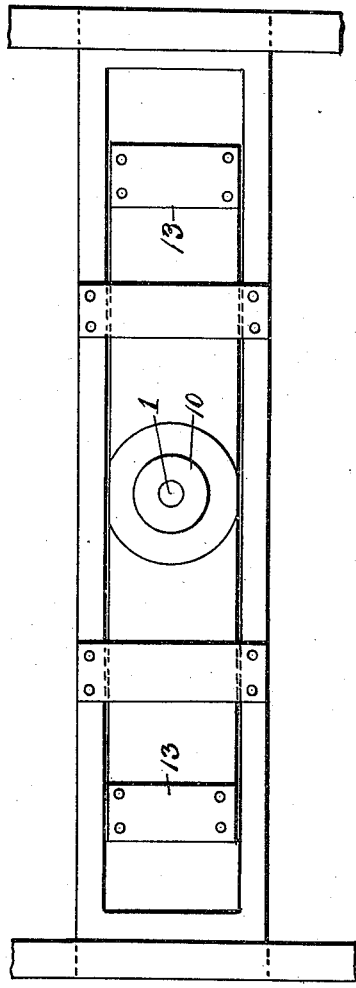
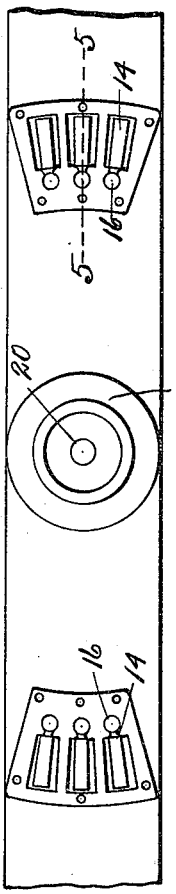
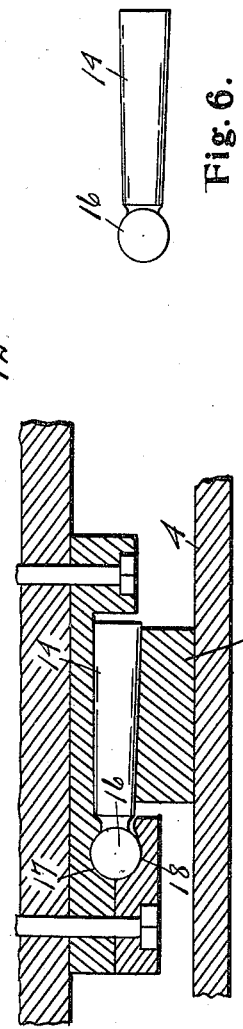

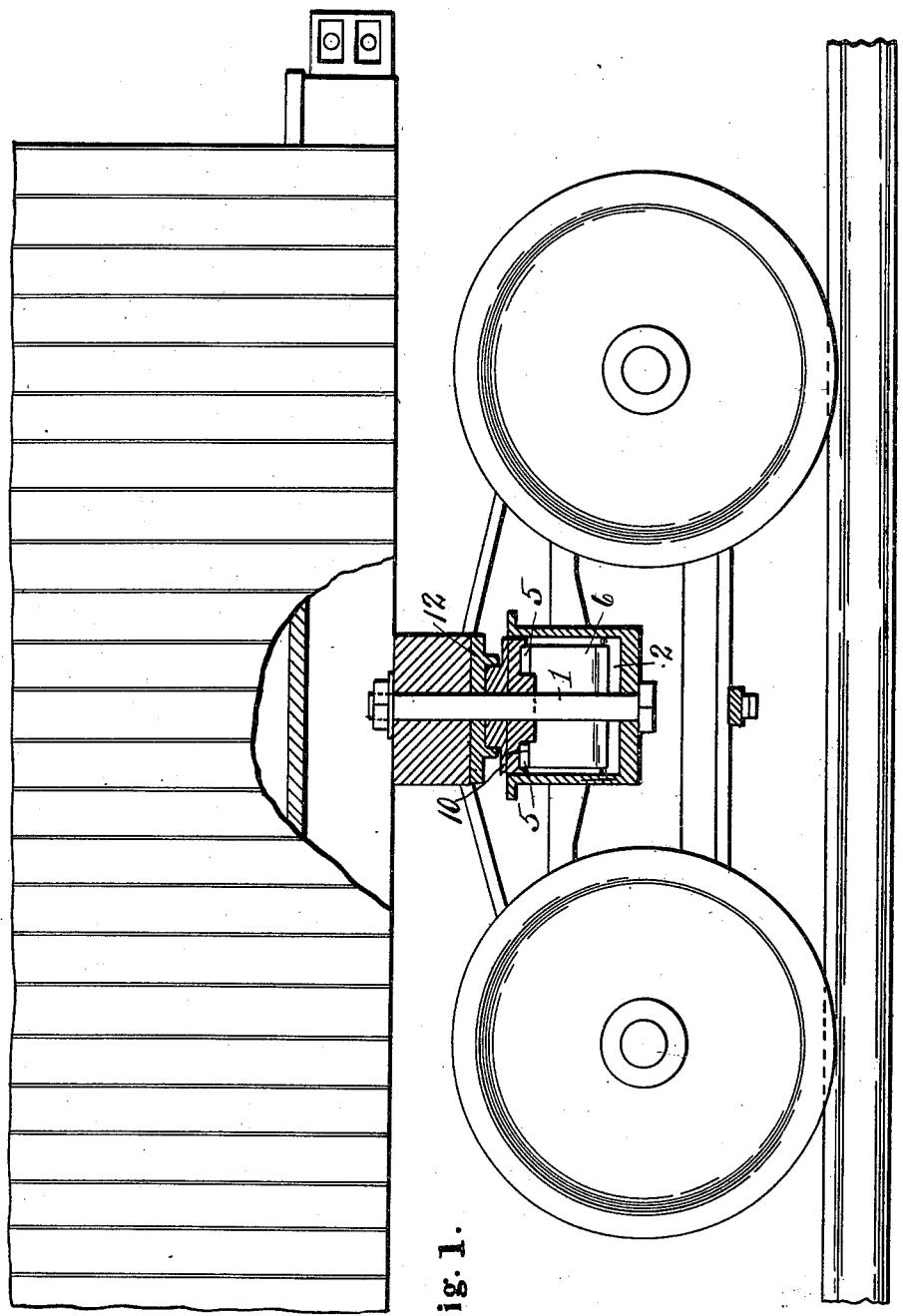

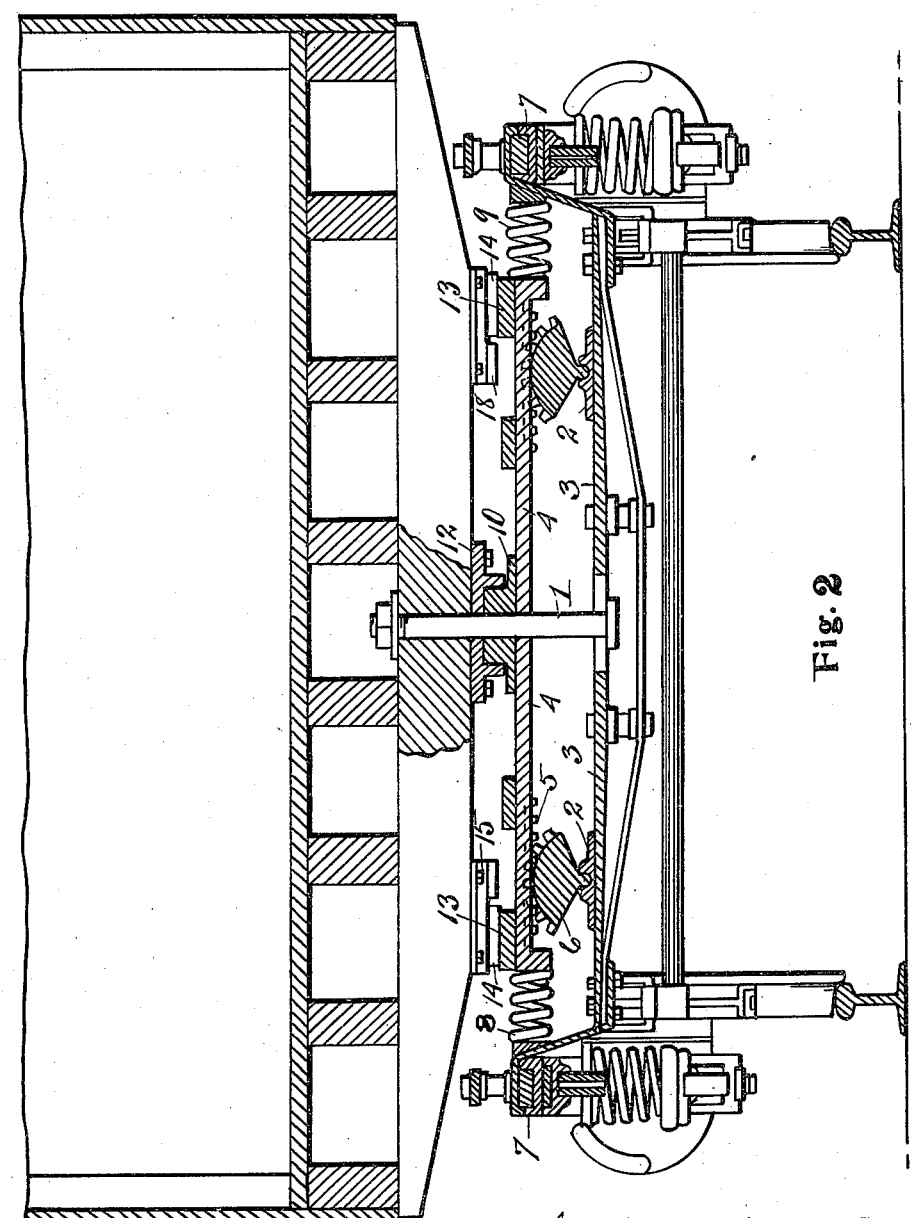

UNITED STATES PATENT OFFICE.

HENRY C. HODGES, OF DETROIT, MICHIGAN.

CAR-TRUCK.

1,006,943.  Specification of Letters Patent.  Patented Oct. 24, 1911.

Application filed December 27, 1909. Serial No. 535,088.

*To all whom it may concern:*

Be it known that I, HENRY C. HODGES, a citizen of the United States, residing at Detroit, county of Wayne, State of Michigan, have invented a certain new and useful Improvement in Car-Trucks, and declare the following to be a full, clear, and exact description of the same, such as will enable others skilled in the art to which it pertains to make and use the same, reference being had to the accompanying drawings, which form a part of this specification.

This invention relates to car trucks.

It has for its object an improved bearing between the car body and a laterally movable bolster mounted on the truck.

In the use of the laterally movable bolster in connection with a car body the movement of the bolster takes place always at a time when the car body itself is swinging, and it is desirable to use with the laterally movable bolster a side bearing on which the car body may be carried and upon which it may swing easily and with the least possible degree of friction.

In the drawings:—Figure 1, is a cross section of the car truck with the laterally movable bolster. Fig. 2, is a side elevation, partly in section, of the truck. Fig. 3, is a plan view of the laterally movable bolster. Fig. 4, is a reverse view of the bearing plate on the under side of the car body. Fig. 5, is a cross section of the bearing. Fig. 6, is an elevation of the bearing roller.

The laterally movable bolster 4, provided with a rack 5 on its under side, rests on a pair of quadrant racks or segmental wheels 6 which are journaled on seats 2. The seats 2 are carried on a transom 3 of a concave or channel construction that joins the side bars of the truck. Between the ends of the laterally movable bolster 4 and the frame 7 are springs 8 and 9 which cushion the bolster in its movement in either direction. Upon the middle of the laterally movable bolster 4 is a bearing 10 through the center of which passes the king pin 1 and upon which rests a saddle 12 bolted or otherwise secured to the bottom of the car body. The laterally movable bolster is provided with bearing plates 13 upon which rest anti-friction rollers 14 housed in a bearing 15 that is bolted or otherwise secured to the bottom of the car. These anti-friction rollers are preferably made slightly conical with a cone surface whose apex would be at the center 20 of the king pin, or the hole through which the king pin passes, and each of the rollers is provided at its small end with an enlarged head 16 that is secured in a suitable cavity 17 and covered by plate 18 that holds the roller from escape and at the same time allows it to roll and to swing slightly. Provision is made in the housing for the swing of the individual rollers, which may swing to a limited degree, but are not permitted to swing to such an extent but that they will immediately reassume a normal position under the action of the car body that rests on them.

The lower end of the king pin 1 passes through a slot in the cross bar of the truck 2 that allows freedom of movement of the king pin across the axis of the truck as the car and the bolster shift laterally across the truck. This truck may be used as a center truck of the three truck cars, or it may be used as the end truck if desired. It allows the car to move laterally over the truck to a limited degree and this lateral movement takes place when the car is turning curves.

What I claim is:—

1. In combination with a car truck, a laterally movable bolster supported thereby, side bearings for the car on said bolster, anti-friction rollers, a housing for said rollers, and means whereby the ends of said rollers adjacent to the middle of the bolster are held in position and the body of each of said rollers is allowed to swing, the said rollers being arranged to interpose between the side bearings and the car, substantially as described.

2. In combination with a car truck, a laterally movable bolster supported thereby, bearing plates upon said bolster, anti-friction rollers comprising cylindrical bodies provided with globular retaining heads and a housing for said anti-friction rollers, substantially as described.

3. In combination with a car truck, a laterally movable bolster supported thereby, a central pin-engaging support midway the ends of said bolster, bearing plates at or near the ends of said bolster, a roller bearing housing, and anti-friction rollers within said housing engaging against said bearing plates, said anti-friction rollers having globular heads retained by the housing, and bodies of conical form, the apex of each, extended, being at the central pin-engaging support, the said bodies being capable of limited oscillation by reason of the constrained globular heads, substantially as described.

In testimony whereof, I sign this specification in the presence of two witnesses.

HENRY C. HODGES.

Witnesses:
CHARLES F. BURTON,
VIRGINIA C. SPRATT.

Copies of this patent may be obtained for five cents each, by addressing the "Commissioner of Patents, Washington, D. C."